March 27, 1962 — G. E. PARKER — 3,027,463
PRIME MOVER REGULATOR
Filed Nov. 25, 1957 — 3 Sheets-Sheet 1

INVENTOR
George E. Parker
By Carlson, Pitzner, Hubbard & Wolfe
ATTORNEY

March 27, 1962 G. E. PARKER 3,027,463
PRIME MOVER REGULATOR
Filed Nov. 25, 1957 3 Sheets-Sheet 2

INVENTOR
George E. Parker
By Carlson, Pitzner Hubbard & Wolfe
ATTORNEY

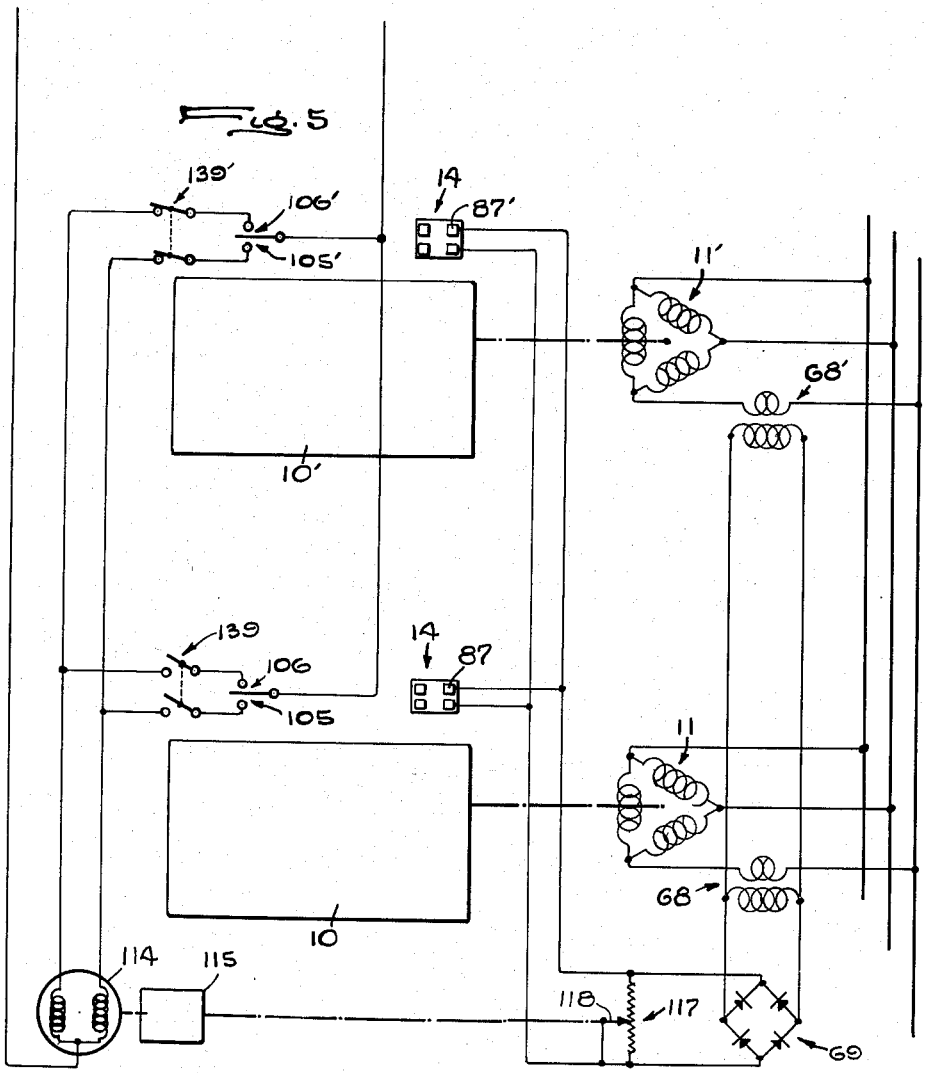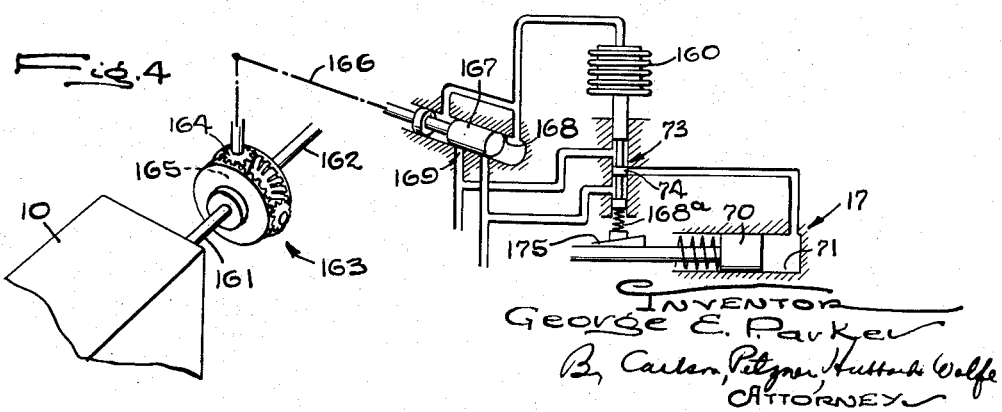

United States Patent Office 3,027,463
Patented Mar. 27, 1962

3,027,463
PRIME MOVER REGULATOR
George E. Parker, Rockford, Ill., assignor to Woodward Governor Company, Rockford, Ill., a corporation of Illinois
Filed Nov. 25, 1957, Ser. No. 698,476
6 Claims. (Cl. 290—40)

This invention relates to a regulator including an ordinary speed governor for controlling the delivery of fuel or other energy medium to a prime mover to maintain constant speed operation of the latter.

The primary object is to combine with the speed governor a device for sensing changes in the prime mover load and arranged to act continuously and earlier and faster than the speed governor to effect quick readjustment of the fuel flow thereby reducing the magnitude of the deviation in the prime mover speed incident to each corrective action.

The invention also resides in the novel manner of combining the speed governor and the load sensing device to permit normal independent functioning of the speed governor at times when the load control is inadequate.

A further object is to provide for automatic adjustment of the load sensing device so as to adapt the same for most efficient action under prevailing operating conditions as the latter change from time to time.

Another object is to utilize the combined speed and load control in a novel manner in the paralleling of electric generators.

Other objects and advantages of the invention will become apparent from the following detailed description taken in connection with the accompanying drawings, in which FIGURE 1 is a schematic view and circuit diagram of the improved speed and load sensing regulator.

FIGS. 3 and 4 are schematic views of modified forms of load sensors.

FIG. 5 is a circuit diagram of part of the control as utilized in paralleling electric generators.

Figure 1:
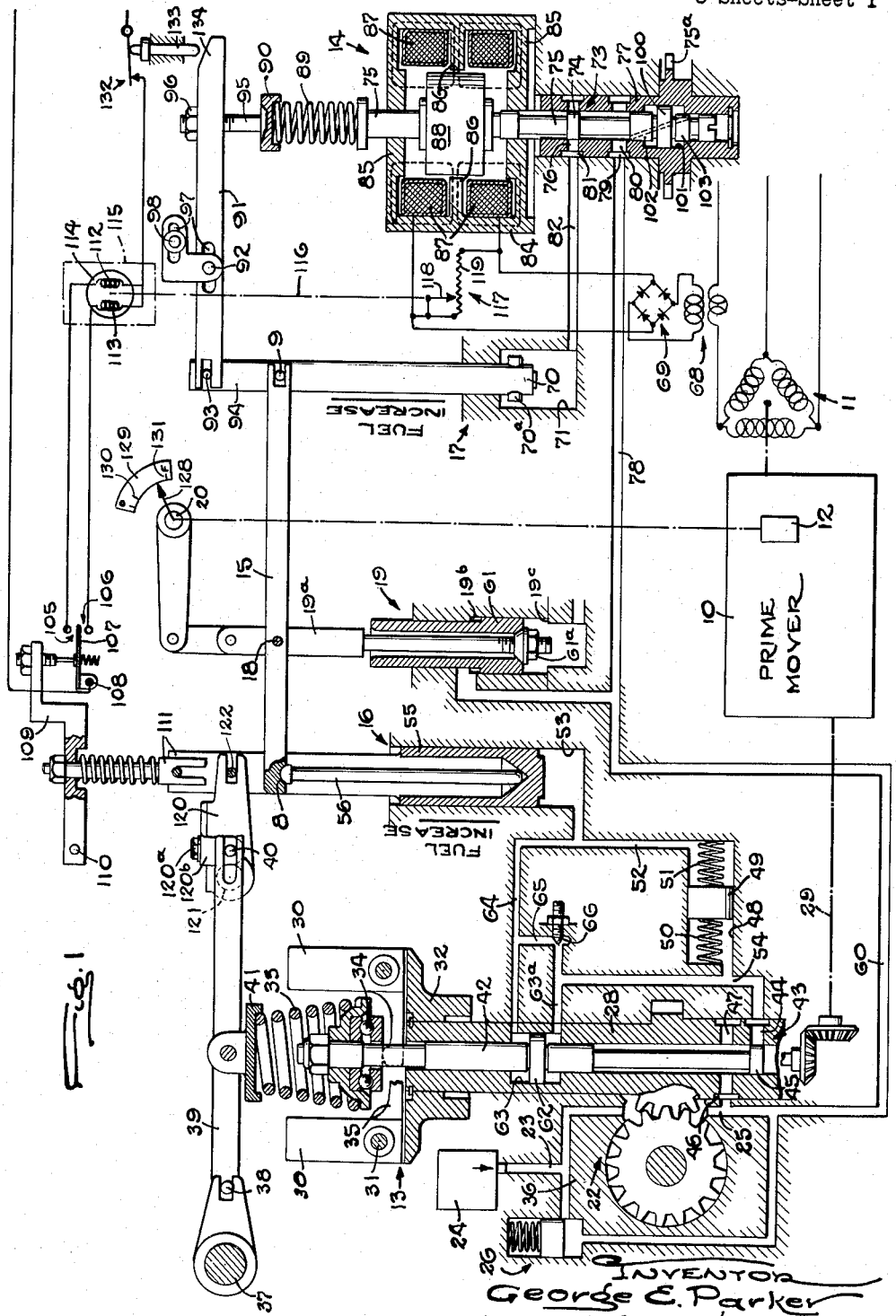

As shown in FIG. 1, the improved regulator is especially adapted for governing the flow of fuel or other energy medium to a prime mover 10 driving an electric generator such as alternator 11 to maintain a precisely constant frequency of the generator output. Control of the fuel flow may be effected by a conventional valve indicated generally at 12.

Generally stated, the improved regulator comprises a conventional speed governor 13, a load sensor 14 whose output motions are combined differentially as by means of a floating lever 15 and the resultant transmitted to the fuel controller 12. In the present instance, both devices operate hydraulically with their respective piston type servos 16 and 17 coupled at 8 and 9 to opposite ends of the lever 15. At a pivot point 18 spaced about one-third of the length of the lever from the pivot 8, the lever is coupled to the piston rod 19a of a biasing servo 19 and also linked to the free end of a crank on a shaft 20 suitably coupled to the movable member of the fuel controller 12 to increase the fuel flow in response to clockwise turning of the shaft. The piston 61 of this servo is movable between limit abutments 19b and 19c and its range along the rod may be shifted by adjusting a nut 61a along the rod 19a.

Fluid pressure for energizing the servos 16, 17 and 19 is derived from a pump 22 built into the governor 13 and including intermeshing spur gears rotatable in a suitable housing in the governor casing indicated by the hatching 36. The pump inlet 23 communicates with an oil sump 24, and a discharge passage 25 leads to a spring loaded valve 26 for by-passing fluid to the sump so as to maintain a substantially constant supply pressure, for example, 360 p.s.i. One gear of the pump is fast on a ported sleeve 28 journaled in the governor casing and coupled through suitable gearing to a shaft 29 of the prime mover. Through a passage 60, the pump discharge pressure is transmitted continuously to the rod end of the cylinder of the biasing servo which thus continuously exerts a downward force of constant magnitude on the lever 15.

Herein, the governor 13 is of the construction disclosed in Patent 2,478,753 which may be referred to for further details. The speed sensor of the governor comprises a pair of flyweights 30 pivoted at 31 on a head 32 fast on the upper end of the ported sleeve 28. The centrifugal force acting on the flyweights is balanced against a compression spring 33 bearing downwardly against the upper race of a ball thrust bearing 34 whose lower race is engaged by arms 35 on the flyweights. The speed setting of the governor is adjusted by manually turning a shaft 37 journaled in and projecting outwardly from the casing 36 and carrying a crank pivoted at 38 on one end of a straight lever 39 whose opposite end is, in the present instance, fulcrumed on a pin 40. Intermediate its ends, the lever carries an abutment 41 for the upper end of the speeder spring 33. The latter is compressed and extended as the adjusting shaft is turned clockwise and counter-clockwise respectively thus correspondingly increasing and decreasing the speed setting of the governor.

The control force derived from changes in the flyweight speed is applied to the plunger 42 of a pilot valve 43 formed by a port 44 in the sleeve 28 coacting with a land 45 of the same width on the plunger. The latter is slidable in the sleeve and is connected at its upper end to the upper race of the bearing 34. Below the land 45, the sleeve communicates with a drain passage. Through a groove 46 encircling the sleeve and hole 47 therethrough, the pressure fluid supply passage 25 communicates continuously with the space above the valve land.

Through a peripheral groove in the sleeve, the outlet port 44 of the valve communicates continuously with a space 54 leading to one end of a cylinder 48 having a piston 49 slidable therein and urged toward a centered position by compression springs 50 and 51. The other end of the cylinder communicates through a passage 52 with the head end of the cylinder 53 of the servo 16 so that pressure fluctuations in the space 54 to which fluid is delivered or from which it is released when the valve 43 is open are communicated to the head of the servo piston 55 through the intermediary of the piston 49. The rod 56 of the piston 55 bears upwardly at 58 against one end of the lever 15 so that the servo 16 acts in opposition to the biasing force of the servo 19.

The governor incorporates a so-called compensating system for producing isochronous operation of the governor 13. This includes a wall or piston 62 fast on the valve stem 42 and reciprocable in a cylinder 63 formed in the sleeve 28 and connected at its lower end to a passage 63a leading to the valve controlled space 54. A passage 64 extends from the upper end of the cylinder to the passage 52 and therefore the servo cylinder 55. A by-passage 65 having a needle valve 66 therein permits slow leakage of fluid between the passages 63a and 64.

In operation, when the land 45, in response to a speed decrease below the prevailing speed setting of the governor, is lowered from its neutral position opening the port 44, pressure fluid will flow into the passage 54. The pressure increase moves the piston 49 to the right compressing the spring 51 and forcing fluid out of the remote end of the cylinder 48 into the servo cylinder 53.

The servo piston 55 is thus moved upwardly swinging the lever 15 about a fulcrum 9 to turn the control shaft in in the fuel-increasing direction. Conversely, a detected rise in speed causes the valve land to be raised above the port 44 allowing fluid to escape to the sump thus decreasing the pressure in the passage 54. This allows the piston 49 to move under the higher pressure existing in the servo cylinder 53 thereby compressing the spring 50 and allowing the servo piston to move downwardly in the speed decreasing direction.

In response to either of the correcting actions above described and due to the spring biasing of the buffer piston 49, a pressure difference develops between the valve controlled passage 54 and the servo passage 52, the differentials being in opposite senses depending on whether the speed rises above or falls below the governor setting. The compensating system above described utilizes these pressure differentials to derive a force acting on the compensating piston 62 in a direction to restore the valve stem to its neutral position. This drooping characteristic is then dissipated gradually through the restriction formed by the needle valve until normal speed has been restored under the changed load as is set forth more fully in the aforementioned patent. This results in the fuel valve taking a new position without a permanent change in the engine speed. As a result of this true isochronous action, the governor adjusts the fuel flow so as to maintain as nearly a constant engine speed as has been possible heretofore.

For a purpose to appear later, it is desirable that the servo piston 55 always occupies a definite axial position when the the prime mover is operating at the desired predetermined speed. This is best accomplished by imparting some degree of so-called permanent speed droop to the governor by transmitting the movements of the piston 55 back to the speeder spring 33 to change the stressing thereof progressively as the piston moves back and forth. Herein, this droop producing mechanism comprises a lever 120 fulcrumed on a fixed pivot 121 and having a short arm carrying the pivot pin 40 of the spring adjusting lever 39. Through a clamping screw 120ª, a bracket 120ᵇ supporting the pivot pin 40 may be adjusted along the lever 120 to vary the lever ratio and the amount of speed droop. The free end of the longer lever arm is pivotally connected to a pin 122 on the rod of the piston 55.

As the piston moves up and down to increase and decrease the fuel flow, the lever 120 is rocked back and forth to raise and lower the abutment 41 and thus respectively decrease and increase the speeder spring force and therefore the speed setting of the governor. With this small amount of permanent speed droop, the piston 55 will always occupy a unique position for each different engine speed.

The load sensing device 14 above referred to operates automatically and continuously to detect all increases and decreases of all magnitudes in the load imposed on the prime mover and initiate proportionate correction of the fuel flow instantaneously and before the changed load becomes effective in changing the speed of the prime mover. In most instances and at all times when the characteristics of the load sensor match the prevailing operating conditions, the necessity of the governor coming to action is avoided. As a result, the fuel is readjusted instantaneously to enable the prime mover to handle the changed load and this, without a measurable change in speed and therefore in the frequency of the generator output.

Where the load is of electrical character as illustrated in FIG. 1 and involves the consumption of electrical energy, variations therein may be sensed and measured readily through the use of a current transformer 68 having its primary winding interposed as shown in FIG. 1 in one of the output lines of the alternator 11. In this embodiment the output alternating current is converted to direct current by means of a rectifier 69 and fluctuations thereof are utilized through the medium of an electro-hydraulic transducer to control the energization of the servo 17 and thus adjust the fuel flow to compensate for the detected load changes. The piston 70 of this servo moves in a cylinder 71 and the piston rod is pivotally connected at 9 to the lever 15. Upward movement of the piston is limited by engagement of a crossbar 70ª with the end wall of the cylinder.

Energization of the servo 17 is controlled by a pilot valve 73 similar to the valve 43 of the speed governor and formed by a land 74 on a stem 75 of the same width as and coacting with ports 76 in a sleeve 77 journaled in the transducer casing and rotated by the prime mover through a connection including a gear 75ª. An outer groove 81 in the sleeve communicates with the ports 76 and a passage 82 leading to the head end of the cylinder 71. Pressure fluid from the pump outlet is supplied to the interior of the sleeve 77 through a passage 78, a groove 79 and one or more holes 80 in the sleeve below the land 74.

In the closed position of the valve as shown, fluid is trapped in the cylinder 70, and the position of the fulcrum 9 is fixed. Raising the land 74 uncovers the lower edges of the ports 76 to admit pressure fluid to the cylinder and raise the piston 70. This rocks the lever 15 upwardly about the fulcrum 8 thus increasing the fuel flow to the prime mover. Conversely, when the land is lowered, fluid from the cylinder 71 is allowed to drain upwardly from the upper end of the sleeve 77 thus allowing the right end of the lever 15 to be lowered under the force of the biasing servo 19, the fuel supply being decreased correspondingly.

The valve stem 75 is moved up and down by the transducer in accordance with changes in the prime mover load as determined by variations in the current flow through the rectifier 69. To this end, the transducer takes the form of a polarized solenoid having a hollow cylindrical cage 84 of magnetic material with end pieces 85 constituting magnetic poles of one polarity and equidistantly spaced from an inwardly projecting intermediate rib 86 constituting a pole of opposite polarity. Multiple turn coils 87 are housed within the cage on opposite sides of the pole 86 and preferably connected in series with each other with the remote terminals joined to the output terminals of the rectifier 69.

An armature in the form of a cylinder 88 of permanent magnet material is fixed to an extension of the valve stem 75 which is slidably guided in and projects through the pole pieces 85. The armature is somewhat shorter than the spacing of the poles 85 and forms with the cage the flux circuits shown in phantom. By polarizing the armature so that its upper end is attracted to the upper pole 85 and its lower end is repelled by the lower pole 85, an upwardly directed force will be exerted continuously on the armature. This force is further increased in the present instance by making the upper end of the armature and the intermediate pole 86 of the housing of the same polarity.

The desired continuous action of the load sensing device in correcting for both increases and decreases in load is achieved by opposing the upwardly directed magnetic force by the force of a spring 89 which is varied automatically in response to changes in the position of the piston 70 whose position at all times corresponds to the prevailing load on the prime mover. Herein, the spring is of the coiled compression type and acts between the upper end of the valve stem 75 and an abutment 90 to urge the armature downwardly. In the centered position of the ports shown in FIG. 1, the spring force just balances the magnetic force and the pilot valve 73 is closed.

To proportion the movements of the servo piston 70 accurately and continuously in accordance with detected changes in the prime mover load, the force exerted by the spring 89 is increased progressively as the servo piston moves in the fuel-increasing direction and similarly decreased in the reverse movement of the piston. This is accomplished through a restoring lever 91 of the proper ratio fulcrumed at 92 on the controller casing and pivotally connected at one end 93 to the upper end of the piston rod 94. At its other end, the lever carries the spring abutment 90 on a stem 95 threaded into or otherwise mounted on the lever for endwise adjustment which is maintained by a lock nut 96. Also, the ratio of the lever may be varied by adjusting the fulcrum pin 92 along the lever as permitted by slots 97 following release of a clamping screw 98 by which the pin supporting bracket is secured to the casing.

It will be apparent that as the prime mover load increases, the current in the coils 87 will increase correspondingly to overcome the force of the spring 89 and raise the valve land 74 to open the port 76. This allows pressure fluid to flow into the cylinder 71 raising the piston 94 to rock the lever 15 and increase the fuel flow and also swing the lever 91 clockwise to compress the spring 89. This increase in the spring force continues until this force just balances the magnetic force at the new load, the valve land then being restored to centered position as shown in FIG. 1.

In a similar way, in response to a detected decrease in load, the valve land is lowered, fluid is released from the cylinder 71, the fuel is increased and the restoring force of the spring 89 is decreased by movement of the lever 91 until the spring and magnetic forces are rebalanced and the valve land recentered. Such readjustment of the servo takes place with every detected change in the prime mover load however small and irrespective of the sense of the change, and each adjustment is precisely proportional to the magnitude of the load change initiating it. As a result, the servo piston 70 always occupies a position corresponding precisely to the prevailing value of the prime mover load.

The readjustment of the load servo 17 takes place instantaneously resulting in correction of the fuel flow before the detected load variation has become effective in changing the prime mover speed. Such quick action is achieved by proper design of the servo 17 and its control, the servo piston in this instance, being movable throughout its full stroke in $1/100$ of a second.

The desired precision in the positioning of the servo 17 is facilitated through the provision of suitable means for preventing substantial axial oscillation of the valve stem 75. Herein, this is accomplished by a dishpot comprising a piston 100 loosely slidable in a cylinder 101 and fast on the valve stem between two smaller lands 102 and 103 also slidable in cylinders formed in the sleeve 77. Through a passage extending diagonally through the stem, fluid at the supply pressure and acting on the upper end of the land 102 is also applied to the lower end of the land 103. This fluid leaks into and fills opposite ends of the cylinder 101 between which fluid must be transferred past the piston 100. The desired damping force is thus achieved in response to each unbalance of the forces controlling the movement of the valve stem.

In another of its aspects, the invention contemplates the automatic adjustment or trimming of the load sensor 14 to compensate for changes which occur from time to time in service use and prevent the sensor from correcting accurately for the load variations. Among such changes are the prime mover temperature, the temperature of the coils 87 of the transducer, and power factor and unbalance of phase loading, etc. in the case of an electrical generating system.

In the present instance, such reconditioning of the load sensor is effected by changing its sensitivity in one direction or the other whenever the speed governor is called into action by failure of the load sensor to correct fully for a given load change. By sensitivity is meant the travel of the piston 70 per unit of change in the current coming from the rectifier 69.

Figure 2:
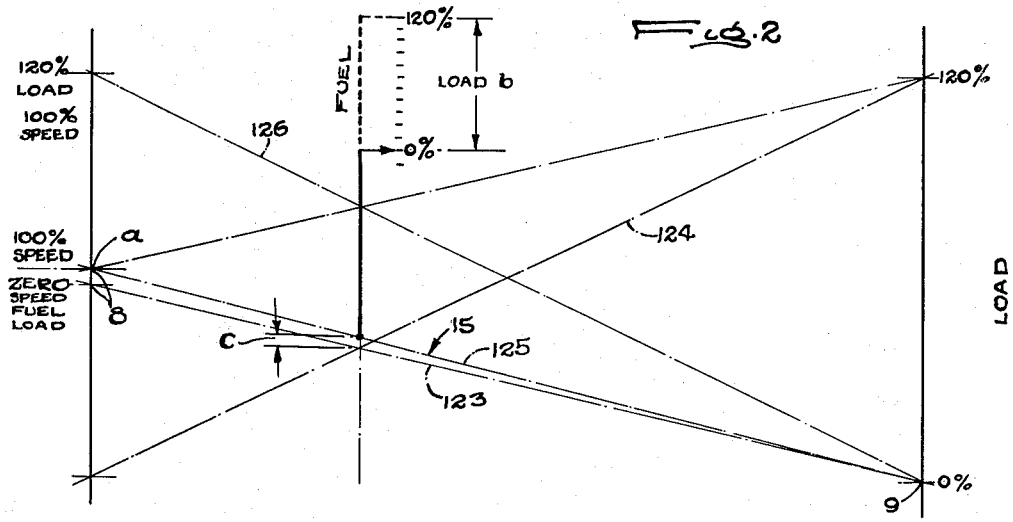
FIG. 2 is a diagram showing different positions of the fuel control actuator.

Such inadequacy of the load sensor is evidenced in this instance by movement of the piston 55 of the governor servo out of a predetermined position $a$ (FIG. 2), which the piston assumes when the prime mover is under no load and running at the full speed required for producing the desired frequency of the generated current. Departure from this condition is detected by closure of either of two switches 105 and 106 whose actuator arm 107 is fulcrumed at 108 and adjustably mounted on the free end of an arm 109 pivoted at 110 and adjustably coupled to a two part extension 111 of the rod of the piston 55. The switches are so-called micro switches with their housings and actuator pins mounted on the governor casing and closely adjusted so as to remain open when the piston 55 and the pivot 8 are precisely in the no-load full-speed position $a$ above referred to but to be closed in response to a small movement, for example .015 of an inch, out of such position.

The switches 105 and 106 control the selective energization of windings 112 and 113 of a reversible electric motor 114 coupled through a suitable speed reducer 115 to a shaft 116 for varying the adjustment of a device 117, in this instance a potentiometer 117 whose setting determines the sensitivity of the transducer. Herein, the shaft 116 carries a wiper 118 coacting with a resistance element whose active end portion 119 is connected across the terminals of the rectifier 69 and therefore is parallel with the transducer coils 87. The position of the wiper along the resistance element thus determines what part of the rectifier output current will be diverted through the coils 87.

With the arrangement above described, the load sensor may, under certain operating conditions, be unable to adjust the fuel flow so as to compensate fully for a detected load change. As a result, the speed governor must make up the deficiency and, when thus called into action, its servo piston 55 is moved out of the normal no-load full-speed position. In the case of under compensation by the load sensor, the switch 105 becomes closed in response to movement of the governor servo. This energizes the motor 114 in a direction to move the wiper 118 to the left and increase the value of the resistance 119 thereby diverting a larger part of the rectifier current to the coils 87. The resulting increase in the magnetic force necessitates a correspondingly greater upward movement of the servo piston 70 in order to recenter the valve 73 following a load change.

This higher position due to the trimming action is accompanied by an increase in fuel causing the prime mover speed to be increased and eventually sensed by the speed governor. The latter then proceeds independently to decrease the fuel thus lowering the piston 55. Such movement continues until the piston 55 is returned to the position $a$ whereupon the switch 105 is opened thus interrupting the trimming action.

Readjustment of the energization of the windings 87 is effected in a similar way whenever the load sensor 14 tends to over-correct for a given load change and thus cause over-speeding of the prime mover. In this event, the switch 106 becomes closed energizing the motor 114 to initiate movement of the rheostat wiper 118 to the right thereby decreasing the current in the windings 87. As before, the resulting decrease in fuel and accompanying speed decrease are eventually detected by the governor which begins its corrective actions to increase the fuel supply. When the piston 55 has been raised to the position $a$, the switch 106 will be opened thus disabling the trimmer and restoring the normal control by the load sensor.

By proper design and with a few simple factory adjustments the combination regulator above described may be adapted for use with a wide variety of prime movers. Thus, the stroke of the biasing servo 19 is equal to a fuel range *b* (FIG. 2) plus the distance *c* extending from zero fuel to a desired overload, for example 120 percent of full load. The pivot 18 is spaced about one third of the length of the lever 15 away from the pivot 8. With the fuel valve closed, the servo piston 70 should be lowered to the head end of the cylinder 71 and the piston 55 spaced from the head end of the cylinder 53 about one half of its operating stroke. Then, the lever 15 will be inclined downwardly and to the right as indicated by the fuel line 123 in FIG. 2.

With this arrangement, the speed governor may, in the event of failure of the transducer, effect full closure of the fuel valve even with the load-sensing servo in the maximum over-fuel position, the lever 15 then assuming the position indicated by the line 124. Or, with the load sensor disabled, the speed governor alone may open the fuel valve to the full overload limit as indicated by the line 126.

Next, the speed of the prime mover required to maintain the desired frequency of the generator output is determined. Then, with the servo piston 70 floating freely at the head end of the cylinder 71, the servo piston 55 is moved upwardly to the position *a* which is assumed when the prime mover is operating under no load but at the full speed required for producing the desired output frequency. At this time, the lever position will be as indicated at 125, the fuel valve being open far enough to maintain the idle operation of the prime mover. With the servo piston 55 in the position *a*, the switch actuating arm 109 is adjusted to center the arm 107 and open both of the switches 105 and 106. As a result, both switches will remain open when the servo piston is in the full-speed no-load position but will be closed selectively upon slight movement of the piston away from this position.

Finally, the spring 89 and the operating ratio of the lever 91 are adjusted so that with the coils 87 deenergized, the piston 70 will just float off from the head end of the cylinder 71 and with the coils energized by current of a predetermined magnitude, the piston 70 will, by the action of the pilot valve 73, be disposed at the maximum fuel limit of its stroke.

All of the foregoing adjustments may be made at the factory and before installation of the regulator on the prime mover eventually to be controlled. In such installation, the only requirement is a proper correlation of the fuel valve actuating linkage with the predetermined stroke of the biasing servo. This is accomplished by adjusting the linkage ratio and connecting the linkage to the shaft in a manner such that a reference pointer 128 on the shaft 20 will be disposed at zero on a coacting scale 129 when the servo piston 55 is in zero fuel position against the stop 19c, and matches the marks 130 and 131 when the shaft is in the no-load full-speed and the maximum fuel positions indicated on the scale.

In the initial operation of the prime mover, the trimmer mechanism will become effective to vary the energization of the windings 87 in the manner above described and condition the load sensor automatically for operation in the intended manner. No special setting of the trimmer mechanism is necessary in adapting the regulator to a given prime mover.

Provision is also made for disabling the trimmer mechanism when the piston 70 of the load servo is in the zero fuel position, thus avoiding adjusting the rheostat 117 at a time when the load sensor is out of operation. This is accomplished by interposing a normally closed switch 132 in one of the current supply leads of the trimmer motor 114 and providing means for opening this switch whenever the piston 70 reaches the lower end of the cylinder 71. Herein, this means comprises a pin 133 slidable in a guide in the regulator casing and disposed in the path of the free end 134 of the restoring lever 91 so that the switch 132 is opened as the lever end reaches the upper limit of its stroke.

To summarize the operation of the regulator when constructed and finally adjusted as above described, let it be assumed that the prime mover is running idly at the full speed required for maintaining the desired frequency of the generated current. The lever 15 will be disposed in the 125 (FIG. 2) position, and the positions of the servos 16 and 17 will remain fixed. Whenever the load on the prime mover changes, the current energizing the windings 87 will be changed correspondingly and the valve 73 operated to vary the energization of the servo 17 in accordance with the changed load. With the load sensor conditioned in accordance with prevailing operating conditions, the fuel control shaft 20 will, following each load change, be rotated by the servo 17 the distance required to exactly correct the fuel flow for such change. The engine speed is thus unaffected and the position of the servo piston 55 remains fixed.

Now, if the fuel change caused by the load sensor does not match the detected load change, the speed of the prime mover will be changed, and the speed governor will be brought into play to make up the discrepancy. As a result, the servo piston 55 will be displaced from the normal no-load full-speed position causing a corresponding one of the trimmer switches 105, 106 to be closed. This initiates operation of the motor 114 and readjustment of the current in the solenoid windings 87 in the manner above described and the eventual response of the speed governor to restore the normal position of the piston 55 thus interrupting the trimming action.

It will thus be seen that the load sensor will be trimmed or conditioned automatically in accordance with prevailing operating conditions so as to adjust the fuel flow just enough to compensate for detected load changes. But, whenever the load control becomes inadequate, the speed governor will come into play not only to independently adjust the fuel flow to make up the deficiency but also to initiate the trimming action for readjusting the load sensor to meet prevailing operating conditions. The overall result is to readjust the fuel more rapidly than has been possible heretofore and to match each fuel change so accurately with the detected load change that the output frequency of the generated current is held within much closer limits than in known prior speed regulating systems.

The trimmer above described is particularly useful in paralleling electric generators driven by separate prime movers 10 and 10′ (FIG. 5). For this purpose, each prime mover is equipped with a combined speed and load responsive regulator of the character above described with the respective levers 39 adjusted to provide a small amount, for example, 1½ percent, of permanent speed droop. Current transformers 68 and 68′ with primary windings in the output lines of the two generators have secondaries connected in parallel with each other and with the input terminals of a single rectifier 69. As before, a potentiometer 117 is connected across the rectifier output terminals which are also paralleled with the windings 87 and 87′ of the load sensors of the regulators for the repsective prime movers. Each regulator is equipped with a set of trimming switches 105, 106, 105′, 106′ operated by its governor servo and arranged as before to control the starting duration of operation of the motor 114 by which the potentiometer slider 118 is moved back and forth. The two sets of switches are connected in parallel and may be rendered operative selectively by closure of an associated switch 139 or 139′.

With this arrangement, the trimming system including the potentiometer, the motor, and the selected switches serves both of the regulators. That is to say, the windings 87 and 87′ of the regulators for both prime movers are readjusted simultaneously so that the two regulators are similarly conditioned at all times for response to resultant of the loads imposed on the interconnected alternators which run the same speeds in the conventional manner with the total load automatically divided between them.

The construction of the load sensor 14 above described will vary with the nature of the prime mover load. When the load is mechanical in character, sensing of changes therein may be effected conveniently by measuring the torque transmitted through the output shaft of the prime mover, such torque being directly proportioned to the load during constant speed operation.

Figure 3:
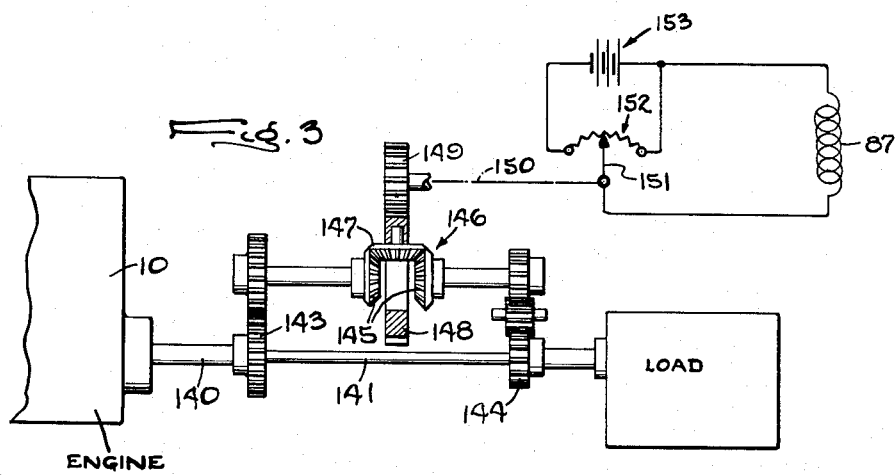

Typical of the devices usable for this purpose is the one shown in FIG. 3. The output shaft 140 of the engine is coupled to the load through a shaft 141 which is relatively long and capable of substantial angular twisting under the loads normally transmitted, the amount of such wind-up varying linearly and in accordance with the torque. At spaced points along its length, the shaft 141 is keyed to gears 143 and 144 respectively coupled directly and reversely to the terminal gears 145 of a differential 146. The intermediate gear 147 of the latter is carried by a gear 148 meshing with a gear 149 on a shaft 150 carrying the wiper 151 of a potentiometer 152 arranged to control the flow of current from a suitable source such as a battery 153 to the windings 87 of the load sensor of the regulator controlling the prime mover.

It will be apparent that the wiper 151 will be swung back and forth with changes in the torque transmitted through the shaft 141 in overcoming changes in the load on the prime mover. Thus, the torque sensing device operates to sense changes in load and cause the solenoid windings 87 to act in the manner above described in varying the energization of the load servo 17 to position the piston 70 precisely in accordance with the prevailing load on the prime mover. The gearing 148 and 149 is of course designed to transmit the load-sensing motion to the potentiometer in the proper ratio to produce current changes in the windings 87 correlated with the fuel valve actuator the same as in the system first described.

As illustrated in FIG. 4, the load sensor for actuating the pilot valve 73 and regulating the energization of the servo 17 may operate mechanically as well as electrically. In this instance, a pressure is produced within a bellows 160 which is precisely proportional to the torque transmitted through the output shaft of the prime mover. For this purpose, the shaft is divided into two parts 161 and 162 keyed to the terminal gears of a differential 163. The spider 165 carrying the intermediate gear 164 of the latter is coupled through a suitable linkage 166 to a piston 167 slidable in a cylinder 168 whose closed end communicates with the interior of the bellows 160. Expansion of the latter is opposed by a compression type spring 168ª whose stress is varied by the motion of the load servo piston 70 as by a restoring cam 175 acting in the same manner as the restoring lever 91 first described.

So long as the prime mover remains unloaded, the gear 164 and the piston 167 will be disposed in the positions shown. As the load is increased, a corresponding torque is applied to the spider 165 moving the piston 167 to the right. This uncovers a port 169 permitting pressure fluid from the supply source to flow to the bellows and the closed end of the cylinder until the built-up pressure balances the prevailing torque on the spider 165. The resulting expansion of the bellows against the force of the spring 168 opens the valve 73 to admit pressure fluid to the cylinder 71 until the spring force overcomes the bellows force and recenters the valve land. Thus, with the ports properly designed, the servo piston 70, through which the load servo 17 adjusts the fuel valve 12, will always be disposed in a position corresponding precisely to the prevailing torque being transmitted by the prime mover.

It will be apparent from the foregoing that a wide variety of devices operating electrically, hydraulically or mechanically or by a combination thereof may be employed for sensing variations in the prime mover loading to vary the energization of the servo 17 as contemplated by the present invention. It is to be understood, therefore, that I do not intend by the present examplary disclosures to limit the invention, but aim to cover all alternative constructions falling within the spirit and scope of the appended claims.

I claim as my invention:

1. The combination of, a prime mover coupled to a load of variable magnitude, a speed governor driven from said prime mover and having a power servo with a movable driven element and a speed sensor controlling the energization of said servo to maintain the position of said element fixed when said prime mover is operating at the speed setting of the governor, said element being disposed in a predetermined normal position when the prime mover is operating at a predetermined speed under no load and being moved in opposite directions away from said position as the prime mover speed rises above and falls below said set speed, a load servo having a driven member movable back and forth, a load sensor for measuring variations in the load on said prime mover and having an electromagnet continuously energized to produce a magnetic force corresponding to the prevailing load, means exerting on said sensor a biasing force opposing said magnetic force, a control device actuated by said magnet and controlling the energization of said load servo to dispose said member at all times in a position corresponding to the prevailing load, means responsive to the movement of said member following a change in said load force to change said biasing force in a direction to rebalance the same against the changed magnetic force, a regulating member movable back and forth to increase and decrease the flow of an energy medium to said prime mover for driving the same, a differential having an intermediate member coupled to said regulating member and terminal members coupled to and following the movements of said driven element and driven member respectively, and trimming mechanism responsive to the movement of driven element and operable to progressively increase and decrease the energization of said magnet while the element is respectively disposed in opposite directions out of said predetermined position.

2. A prime mover regulator as defined by claim 1 in which said trimming mechanism includes an adjustable potentiometer connected in parallel with said magnet, a reversible electric motor coupled to the adjusting member of said potentiometer, two switches controlling the direction and extent of operation of said motor, and means actuated by said driven servo element and operable to maintain both switches open when the element is in said predetermined position and close the respective switches when the element is disposed in opposite directions out of such position.

3. The combination of, a prime mover coupled to a load of variable magnitude, a speed governor driven from said prime mover and having a power servo with a movable driven element and a speed sensor controlling the energization of said servo to maintain the position of said element fixed when said prime mover is operating at the speed setting of the governor, said element being disposed in a predetermined normal position when the prime mover is operating at a predetermined speed under no load and being moved in opposite directions away from said position as the prime mover speed rises above and falls below said set speed, a load servo having a driven member movable back and forth, a load sensor for measuring variations in the load on said prime mover and producing a force corresponding to the prevailing load, means exerting on said sensor a biasing force opposing said load force, a control device actuated by said sensor and controlling the energization of said load servo to dispose said member at all times in a position corresponding to the prevailing load, means responsive to the movement of said member following a change in said load force to change said biasing force in a direction to rebalance the same against the changed load force, a regulating member movable back and forth to increase and decrease the flow of an energy medium to said prime mover for driving the same, a differential having an intermediate member coupled to said regulating member and terminal members coupled to and following the movements of said driven element and driven member respectively, and trimming mechanism responsive to the movements of said driven servo element and operable to respectively increase and decrease the value of one of said forces while said driven element is disposed in opposite directions out of said predetermined position.

4. A prime mover regulator as defined by claim 3 in which said trimming mechanism includes a reversible power actuator operable in opposite directions to increase and decrease said load force.

5. The combination of, a prime mover coupled to a load of variable magnitude, a speed governor driven from said prime mover and having a power servo with a movable driven element and a speed sensor controlling the energization of said servo to maintain the position of said element fixed when said prime mover is operating at the speed setting of the governor, said element being disposed in a predetermined normal position when the prime mover is operating at a predetermined speed corresponding to the governor speed setting and being movable in opposite directions away from said position as the prime mover speed rises above and falls below said set speed, a load servo having a driven member movable back and forth, a load sensor for measuring variations in the load on said prime mover and producing a force corresponding to the prevailing load, means exerting on said sensor a biasing force opposing said load force, a control device actuated by said sensor and controlling the energization of said servo to dispose said member at all times in a position corresponding to the prevailing load, means responsive to the movement of said member following a change in said load force to change said biasing force in a direction to rebalance the same against the changed load force, a regulating member movable back and forth to increase and decrease the flow of an energy medium to said prime mover for driving the same, a differential having an intermediate member coupled to said regulating member and terminal members coupled to and following the movements of said driven element and driven member respectively, and trimming mechanism responsive to the movements of said driven servo element and operable to respectively increase and decrease the sensitivity of said load sensor while said driven element is disposed in opposite directions out of said predetermined position.

6. The combination of, a prime mover coupled to a load of variable magnitude, a regulator movable to different positions to correspondingly vary the flow of an energy medium to said prime mover, first and second power servos adapted to be variably energized and each having a driven element positioned in accordance with the degree of such energization, a differential having terminals respectively movable back and forth by said elements and an output member coupled to said regulator, a speed governor selectively operable to vary the energization of said first servo in response to deviations in the prime mover speed from a value predetermined by the governor setting, said governor including a compensating mechanism responsive to such deviations in speed to vary the governor speed setting whereby to maintain isochronous operation of said prime mover, a device controlling the energization of said second servo and movable back and forth through a predetermined centered position in which the servo energization is substantially fixed, means for sensing changes in the load on said prime mover and actuating said device to respectively increase and decrease the energization of said second servo in accordance with the directions of said device from said centered position, and means in addition to said compensating mechanism for further adjusting the speed setting of said governor in accordance with changes in the position of the driven element of said first servo whereby to impart speed droop to the governor.

References Cited in the file of this patent

UNITED STATES PATENTS

| | | |
|---|---|---|
| 814,433 | Conkling | Mar. 6, 1906 |
| 1,044,233 | Osborne | Nov. 12, 1912 |
| 1,110,799 | Kramer | Sept. 15, 1914 |
| 1,709,689 | Staege | Apr. 16, 1929 |
| 1,792,241 | Ray | Feb. 10, 1931 |
| 1,984,920 | Doyle | Dec. 18, 1934 |
| 2,116,440 | Maas | May 3, 1938 |
| 2,368,567 | Philo | Jan. 30, 1945 |
| 2,371,157 | Drake | Mar. 13, 1945 |
| 2,501,340 | Kresser | Mar. 21, 1950 |
| 2,647,493 | Whitehead et al. | Aug. 4, 1953 |
| 2,692,342 | Nichols et al. | Oct. 19, 1954 |
| 2,783,391 | Crever | Feb. 26, 1957 |
| 2,847,582 | Feiss | Aug. 12, 1958 |